March 25, 1969  FUMIO SAKAKI ET AL  3,434,783
CARTRIDGE-TYPE MOTION PICTURE CAMERA HAVING AUTOMATICALLY
ADJUSTABLE FILM GATE
Filed March 1, 1966  Sheet 1 of 6

United States Patent Office
3,434,783
Patented Mar. 25, 1969

3,434,783
CARTRIDGE-TYPE MOTION PICTURE CAMERA HAVING AUTOMATICALLY ADJUSTABLE FILM GATE
Fumio Sakaki, Nagoya, and Toshimitsu Nakamura, Inabe-gun, Japan, assignors to Elmo Company Limited, Mizuho-ku, Nagoya, Aichi Prefecture, Japan
Filed Mar. 1, 1966, Ser. No. 530,814
Claims priority, application Japan, Jan. 31, 1966, 41/5,516
Int. Cl. G03b *19/18*
U.S. Cl. 352—72    2 Claims

ABSTRACT OF THE DISCLOSURE

An aperture plate assembly for a small-sized magazine-type cinematographic camera device comprises a stationary aperture plate and a movable aperture plate mounted on a leaf spring having pins projecting from the camera body to move the movable plate along the optical axis of an objective. Upon connecting to the main camera body a particular magazine having loaded therein a wider film, the magazine pushes the pins disposed on the leaf spring to automatically move the movable plate away from the stationary plate, whereby two ridges on both sides of the stationary plate cooperate with one of the ridges on the movable plate to define a film track with side guides for the wider film. Upon connecting to the main camera body another magazine having loaded therein a narrower film, the magazine accepts within it the pins for automatically moving the movable aperture plate whereby the ridges on both sides of the movable plate cooperate with the intermediate ridge on the stationary plate to define a film track for the narrower film.

---

This invention relates in general to a small-sized cinematographic camera device of the so-called magazine type including a main body having different film loading chambers selectively secured thereto. Particularly the invention concerns a system for automatically interchanging a film gate in such a camera device.

As well known, the double width 8 mm. cinefilm includes a pair of exposure zones longitudinally juxtaposed to each other. One of the exposure zones can first travel in one direction to be exposed to a scene or scenes to be photographed and thereafter the other exposure zone travels in the opposite direction for exposure purposes. In addition, there is known the single width type of 8 mm. cinefilm having a somewhat different frame size from the double width type and travelling only in one direction to be exposed to a scene or scenes to be photographed.

The two types of 8 mm. cinefilm are commercially available in various forms. For example, the roll type of 8 mm. cinefilm wound on a spool may be wound up on a separate empty spool within the associated camera device after the cinefilm is subjected to exposure. Also there is actually employed the cartridge system. A cartridge is provided with an exposure opening and has accommodated therein a length of 8 mm. cinefilm in such a manner that the cartridge is required only to be loaded within the associated camera device to permit the length of cinefilm to be supplied, exposed, and wound up.

Further there have been actually employed magazine type small-sized cinematographic camera devices comprising a main body common to various magazines having accommodated therein lengths of black and white or colored cinefilm respectively and adapted to be interchangeably secured to the main body and another magazine type of small-sized cinematographic camera device modified such that the magazine involved can change from its normal position to its upsidedown position to permit a length of double width 8 mm. cinefilm to travel in the opposite direction for exposure purpose.

However, the conventional magazine types of camera devices can not use both the double and single width 8 mm. cinefilms.

Accordingly it is an object of the invention to provide a novel and improved small-sized cinematographic camera device of the magazine type capable of selectively using two types of small-sized cinefilm of different width such as the double width 8 mm. cinefilm and the single width 8 mm. cinefilm by automatically interchanging a film gate.

It is a special object of the invention to provide, for the camera device as described in the preceding paragraph, a novel and improved system for automatically interchanging a film gate in order to selectively use the two types of small-sized cinefilm different in width from each other.

With the aforesaid objects in view, the invention resides in a system of automatically interchanging a film gate in a small-sized cinematographic camera device comprising a main body and at least two film magazines capable of having loaded therein lengths of small-sized cinefilm different in film width from each other, the system including aperture means disposed on that wall surface of the main body engaging the associated wall surface of a selected one of the film magazines to define a film gate, characterized in that the aperture means comprises a stationary aperture member secured to the wall surface of the main body and a movable aperture member movable toward and away from the stationary aperture member between a first operative position where a gate for one type of cinefilm is defined and a second operative position where a gate for the other type of cinefilm is defined, the movable aperture member being normally maintained resiliently in its first operative position, and means on the associated wall surface of each film magazine for bringing said movable aperture member into either of the first or second operative positions in accordance with the type of cinefilm loaded in the particular film magazine operatively connected to said main body.

In a preferred embodiment of the invention, the movable aperture member can be resiliently disposed between the rear wall surface of the main camera body and the stationary aperture member and has a first operative position where it contacts the stationary aperture member and a second operative position where it is slightly spaced away from the stationary aperture member. The movable aperture member includes an aperture acting as a film aperture and is provided on that surface thereof facing the film magazine with a pair of parallel ridges extending in the direction of travel of the cinefilm to define the film gate for the narrower type of cinefilm in the first operative position of the movable aperture member, while the stationary aperture member includes an aperture aligned with the aperture on the movable aperture member and is provided on that surface thereof facing the film magazine with three parallel ridges extending in the direction of travel of the cinefilm to define with the ridges on the movable aperture member a film gate for the wider type of cinefilm in the second operative position of the movable aperture member. Means on the resilient means for normally maintaining the movable aperture member at the first operative position is responsive to operative connection of the selected one of the film magazines in which a length of wider type of cinefilm is loaded to bring the movable aperture member into the second operative position. On the other hand only the film magazines in which a length of narrower cinefilm is loaded is provided on the front surface with means to render the means on the resilient means ineffective to bring the movable aperture member into the second operative position while maintaining the latter in the first operative position.

The stationary aperture member may be advantageously provided with adjustment means for effecting fine adjustment of the distance between the movable and stationary aperture members.

Conveniently the adjustment means can comprise at least three adjusting screws screwed into the stationary aperture member and having their ends abutting against the movable aperture member.

The invention as to its organization and its method of operation as well as other objects and advantages thereof will become more readily apparent from the following detailed description taken in conjunction with the accompanying drawings in which:

Figure 1:
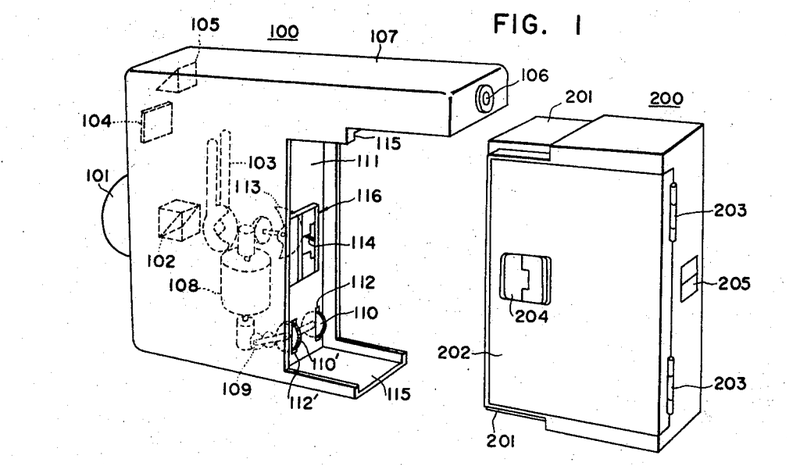
FIG. 1 is an exploded perspective view of a small-sized cinematographic camera device constructed in accordance with the teachings of the invention.

Referring now to FIG. 1, there is illustrated a small-sized cinematographic camera device constructed in accordance with the teachings of the invention. The arrangement illustrated comprises a main body of a small-sized cinematographic camera device generally designated by the reference numeral 100 and a film magazine generally designated by the reference numeral 200 and detachably connected to the main body 100. The main camera body 100 includes a photographic objective 101 on the front face, and a cemented prism 102 and an automatic diaphragm device 103 disposed one after another in the named order along the optical axis of the objective within the main body. The cemented prism 102 is composed of a pair of prisms cemented to each other to sandwich a partially reflecting plane therebetween and serves to split a beam of light from the objective 101 into a transmitted beam portion of light passed to the automatic diaphragm device 103 and a reflected beam portion of the light directed to a photoelectric element 104 which, in turn, controls the automatic diaphragm device 103 in accordance with the amount of light incident on the photoelectric element 104 in the known manner. The beam portion of light reflected from the prism 102 also passes through a view finder system including a prism 105 and an eyepiece 106 disposed on the rear end of an upper extension 107 of the main camera body.

Further the main camera body 100 includes a small-electric motor 108 connected to a source of electric power (not shown) and controlled by the operation of a start pushbutton (not shown), a train of gears 109 driven by the motor and a pair of bilateral gears 110 and 110'. Secured on the rear side of the main camera body 100 is a mounting plate 111 for mounting an aperture assembly as will be described in detail hereinafter, and having a pair of openings 112 and 112' formed therein at positions permitting the pair of gears 110 and 110' to partially project through the rear face of the main camera body 100. Rotatably disposed between the automatic diaphragm device 103 and the aperture assembly generally designated by the reference numeral 116 and immediately in the front of the latter is a rotary shutter 113 similarly driven by the motor 108 to permit the beam portion of light passed through the automatic diaphragm device 103 to intermittently pass to the aperture assembly. Disposed in the rear of the rotary shutter 113 is an intermittent feed mechanism 114 comprising a cam and feed claw combination driven in synchronization with the rotary shutter 113 to intermittently feed a small-sized cinefilm (not shown) involved. The main camera body 100 has a pair of upper and lower guide grooves 115 extending rearwardly from the upper and lower ends thereof for a purpose which will become apparent hereinafter. The above-mentioned components are of the conventional construction except for the aperture assembly.

As shown in FIG. 1, the magazine 200 is provided on the front portion of each of the upper and lower sides with a recessed or joining portion 201 complementary in shape to the guide groove 115 on the main camera body to engage the latter, and a cover member 202 hinged to the magazine by a pair of hinges 203 to form one side of the magazine. A locking member 204 is provided on the cover member 202 and a footage meter 205 is provided on the rear side of the magazine.

Figure 2:
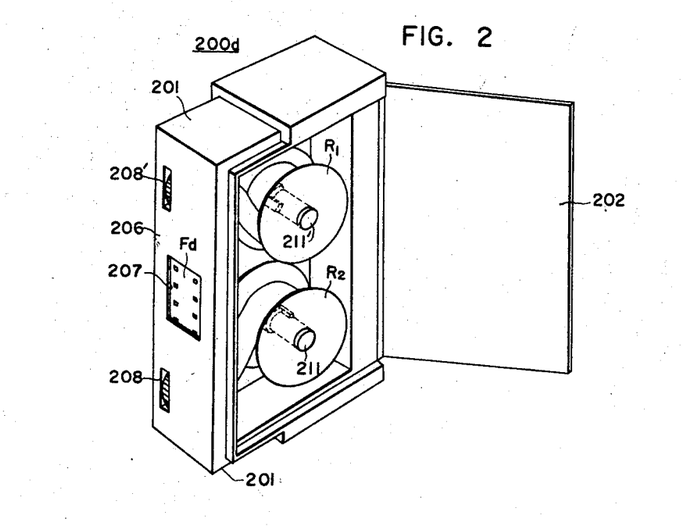
FIG. 2 is a perspective view of a magazine suitable for use with the device shown in FIG. 1, the illustrated magazine being designed to be used with a length of double width 8 mm. cinefilm and having a cover in its open position for the purpose of clearly illustrating the internal structure.
Figure 3:
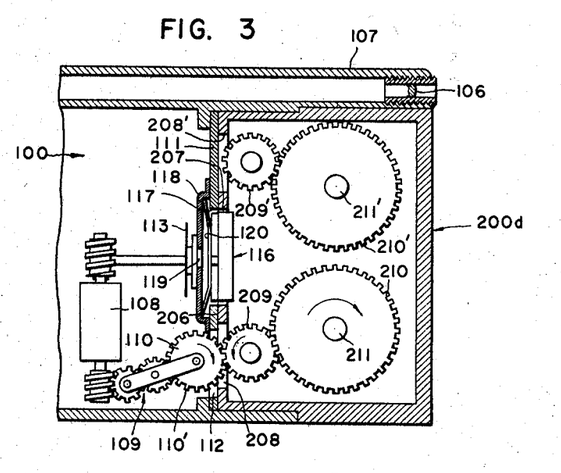
FIG. 3 is a fragmentary sectional elevational view of the main camera body having connected thereto the magazine illustrated in FIG. 2 and illustrating principally a transmission mechanism.

As shown in FIGS. 2 and 3, a magazine 200d similar to the magazine 200 is provided on the front face 206 or that face abutting against the mounting plate 111 when connected to the main camera body with a window 207 into which the aperture assembly is adapted to be fitted. A length of small-sized cinefilm Fd accommodated in the magazine is adapted to be exposed to light from an object to be photographed through the window 207 one frame at a time.

The magazine 200d illustrated in FIGS. 2 and 3 is suitable for use with the invention. The magazine 200d which is exclusively used with a length of the conventional double width 8 mm. cinefilm is, in addition to the above-mentioned window 207, provided with a pair of upper and lower slots 208' and 208 on the front face 206 adjacent one of the longer edges, for example, the left-hand edge as viewed in FIG. 2. As best shown in FIG. 3, the slots 208 and 208' have a pair of gears 209 and 209' disposed therein respectively. If the magazine 200d is operatively connected to the main camera body 100, the lower gear 209 meshes with the gear 110 on the main camera body in the associated slot 208 as shown in FIG. 3 whereas in the upside down position of the magazine the gear 209', shown at its upper position in FIG. 3, located now at its lower position will mesh with the gear 110' within the slot 208'. The pair of gears 209 and 209' meshes respectively with a pair of gears 210 and 210' rotatably disposed in vertically spaced relationship within the magazine 200d and operatively coupled to a pair of spool shafts 211 and 211' through individual overload slip mechanisms of conventional construction (not shown).

From the foregoing it will be appreciated that with the magazine 200d operatively connected to the main camera body 100 at either its normal or upside down position depression of a start pushbutton (not shown) causes a length of double width 8 mm. cinefilm Fd loaded in the magazine to be fed from a reel $R_1$ now located at the upper position to a reel $R_2$ now located at the lower position by a feed claw as will be described hereinafter through rotational movement of the spool shafts 211 and 211'.

The invention will subsequently be described as being applied to a small-sized cinematographic camera device having the general construction thus far described.

Figure 4:
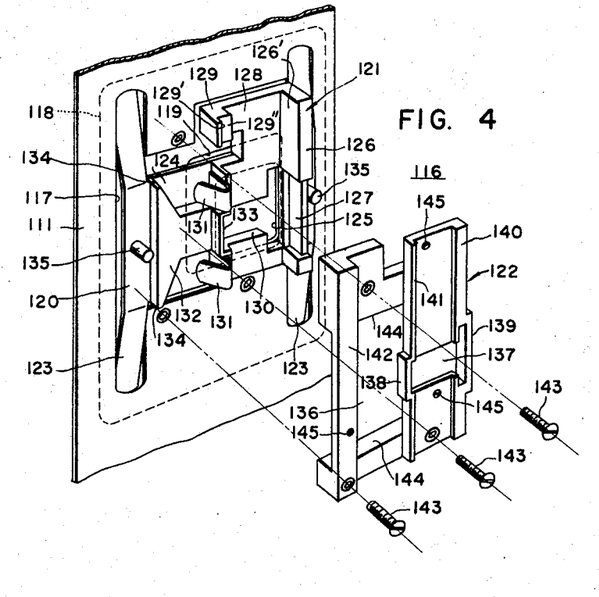
FIG. 4 is an exploded perspective view of an aperture assembly constructed in accordance with the teachings of the invention.
Figure 5:
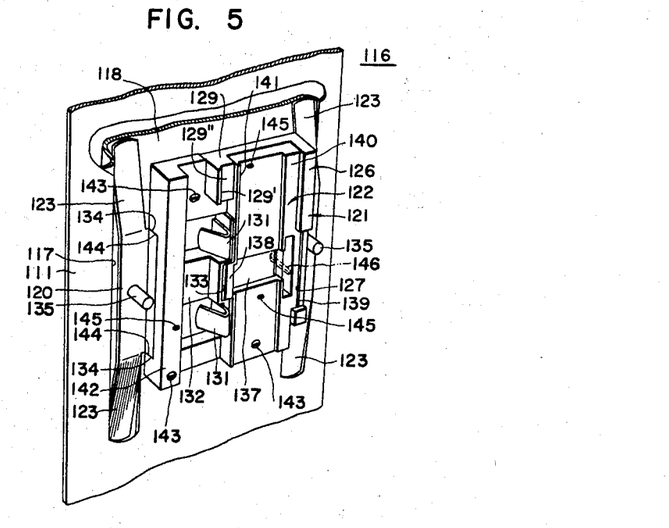
FIG. 5 is a perspective view of the aperture assembly illustrated in FIG. 4 and at its assembled position.

As shown in FIG. 4, the mounting plate 111 is provided in the middle portion with a substantially H-shaped opening 117. This substantially H-shaped opening 117 is opposite a tray-shaped back plate 118 secured to the internal side of the mounting plate 111 as shown in FIGS. 3 to 5 inclusive and having formed therein an opening 119 as shown in solid lines in FIG. 3 and also partially shown in dotted lines in FIG. 4. It will be understood that the centers of the openings 117 and 119 lie on the optical axis of the photographic objective 101.

As shown in FIGS. 3 and 4, an H-shaped leaf spring 120 is loosely interposed within the space between the back and mounting plates 118 and 111 respectively in order to support a movable aperture member 121 constituting a part of the aperture assembly 116 as will be described in detail hereinafter. As more clearly shown in FIG. 4, the H-shaped leaf spring 120 comprises a pair of spaced parallel legs 123 and a relatively wider bridge 124 integrally connecting both legs. The legs 123 are supported on both end portions by both ends of the respective leg portions of the H-shaped opening 117 and have the intermediate portions slightly projecting beyond the opposite side of the mounting plate 111. The bridge 124 has the movable aperture member 121 secured to the rear side or that side facing the opening 117 on the mounting plate 111 by set screws (not shown) and is provided with an opening 125 aligned with the opening 119 on the back plate 118.

The movable aperture member 121 has a longitudinal ridge 126 disposed on the righthand edge as viewed in FIG. 4 which includes in its lower portion 127 a thin portion providing a guide groove, and has a relatively short longitudinal ridge 129 disposed substantially centrally on the upper portion and spaced from the ridge 126 by a land portion 128 in which a T-shaped aperture 130 positioned relative to the ridge 126 at an angle of 90° is formed superposed to the openings 119 and 125 with the vertical portion substantially abutting against and aligned with the guide groove 127. The righthand ridge 126 has an inner surface 126' opposed to the central ridge 129 which, in turn, has a stepped end face composed of an outer projection whose inside is designated at 129' and a flat end portion 129" for a purpose as will be apparent hereinafter. The ridge 126 is higher than the ridge 129 and their opposing sides 126' and 129' provide a pair of film guiding surfaces with a distance between the opposing sides just sufficient to permit a single width 8 mm. cinefilm to pass therebetween. The distance may be on the order of from 8.2 to 8.3 mm.

The movable aperture member 121 has a pair of vertically spaced pressing springs such as leaf springs 131 disposed directly below the short ridge 129 and on the left of and above and below the aperture 125. The leaf springs are fixedly disposed only at their roots between the bridge 124 of the H-shaped leaf spring 120 and the adjacent portions of the movable aperture member 121 so as to have a sufficient flexibility to press the cinefilm lightly against the guiding surface 126' of the ridge 126. The movable aperture member 121 further includes another land portion 132 extending from the lefthand edge as viewed in FIG. 4 of the land portion 128 and a guide groove 133 is formed between the two land portions 128 and 132 and communicating with the aperture 130. The upper and lower ends of the land portion 132 provide a pair of guiding surfaces 134.

The H-shaped leaf spring 120 is provided centrally on the leg portions 123 sandwiching the movable aperture member 121 therebetween with a pair of pins 135 adapted to be pressed by the front face 206 of the magazine 200d when it is in engagement with the main camera body 100.

The aperture assembly 116 includes a stationary aperture member 122 as shown at the exploded position in FIG. 4. As shown, the stationary aperture member 122 comprises a pair of bilateral apertures 136 and 137. The lefthand aperture 136 as viewed in FIG. 4 is rectangular and so dimensioned that, when the stationary aperture member 122 is secured to the mounting plate 111 in the manner as will be later described, the lefthand land portion 132 on the movable member 121 and the pair of the leaf springs 131 just fit into the rectangular aperture 136. The righthand aperture 137 is similar in both shape and position to the aperture 130 on the movable member 121 but somewhat smaller than the latter. With the stationary member secured to the mounting plate 111 the aperture 130 is substantially superposed over the aperture 137.

The stationary aperture member 122 further includes a pair of guiding projections 138 and 139 on the lateral sides of the T-shaped aperture 137 adapted to be fitted into the pair of guiding grooves 133 and 127 on the movable member 121 respectively (FIG. 5) and three longitudinal ridges 140, 141 and 142 on the righthand edge, the central portion and the lefthand edge, as viewed in FIG. 4, having their ends adapted to be flush with the film sliding face 129" of the short ridge 129 when the movable aperture member 121 is in its normal or first operative position where both members contact each other (see FIG. 5). The outside dimension between the ridge 142 on the stationary aperture member 122 and the ridge 126 on the movable aperture member 121 is preferably equal to the width of the double width 8 mm. cinefilm for a purpose which will be apparent hereinafter.

In order to secure the stationary aperture member 122 to the mounting plate 111, so as to contact the movable aperture member 121, three countersunk screws 143 (see FIG. 4) may be screwed through suitable holes on the stationary member into the mounting plate 111 (see FIG. 5).

When the stationary aperture member 122 has been secured to the mounting plate 111 to complete the aperture assembly 116 as shown in FIG. 5, the lefthand aperture 136 has the land portion 132 and the two leaf springs 131 on the movable member fitted thereinto, the aperture 137 is in the region of the aperture 130, the pair of guiding projections 138 and 139 are fitted into the pair of guiding grooves 133 and 127 and the three longitudinal ridges 140, 141 and 142 are flush with the sliding surface 129" of the ridge 129 as above described. In addition, the stationary member 122 is urged into contact with the movable member 121 by the action of both resilient legs 123 of the H-shaped leaf spring 120. Under these circumstances, the movable member 121 is in its normal or first operative position as will be described hereinafter and normally maintained in that position by the action of the spring 120. In order to move the movable aperture member 121 to its second operative position where it is slightly spaced away from the stationary member 122, the pair of pressing pins 135 on the H-shaped leaf spring 120 can be pressed toward the mounting plate 111 in the manner as will be described hereinafter. It is, however, to be noted that the guiding grooves 127 and 133 and the pair of guiding surfaces on the movable members 121 always engage the projections 139 and 138 and the upper and lower edges 144 of the rectangular aperture 136 on the stationary member 122 ensuring that the movable member is prevented from moving longitudinally and transversely with respect to the stationary member.

In order to effect fine adjustment of the distance between the stationary and movable members 122 and 121 respectively during the assembling operation, at least three countersunk adjusting screws 143 can be screwed into the stationary member 122 in any suitable positions not interfering with passage of the cinefilm such that their ends extend through the stationary member and abut against the land portions 128 and 132 with their heads not projecting from that portion of the stationary member along which the cinefilm passes.

The stationary and movable aperture members 122 and 121 may be conveniently made of any suitable metallic material by a die casting technique.

In FIG. 5 it will be also seen that a feed claw 146 forms a part of an intermittent film feed mechanism provided within the longitudinally elongated portion of the transverse portion of the T-shaped aperture 137. The claw 146 is adapted to effect vertical and reciprocal movement in that elongated portion to intermittently feed a cinefilm involved in the manner well known to those skilled in the art. Such a claw, however, does not form a part of the invention and need not be further described.

Figure 6:
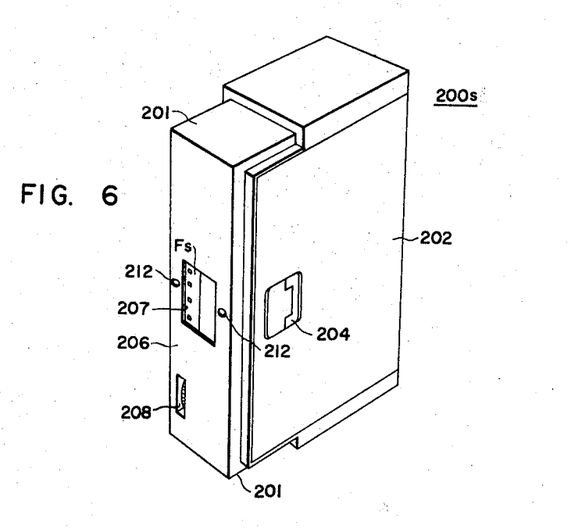
FIG. 6 is a view similar to FIG. 2 but illustrating a magazine for use with a length of single width 8 mm. cinefilm.
Figure 7:
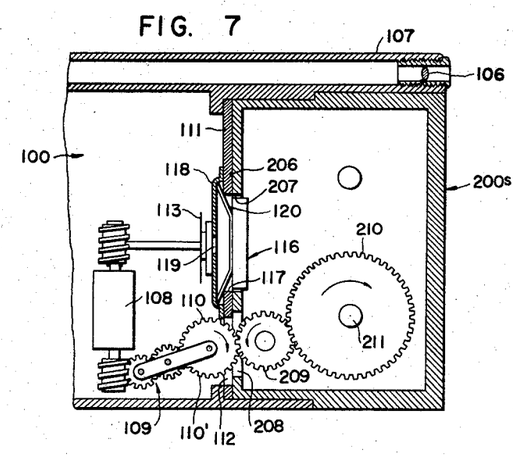
FIG. 7 is a view similar to FIG. 3 but illustrating the use of the magazine shown in FIG. 6.

According to the teachings of the invention, there is provided, in addition to the magazine 200d as previously described in conjunction with FIGS. 2 and 3, at least one other magazine for use with the single width 8 mm. cinefilm. Presently different types of single width 8 mm. cinefilm are commercially available and one of the main differences between the various types is the fact that one type of cinefilm is loaded in a film cartridge including a pressure plate therein whereas another type of cinefilm is loaded in a film cartridge including no pressure plate therein. The one type of cinefilm was developed by Eastman Kodak Company in the United States and is known as "the super 8 system" while the other type of cinefilm was developed by Fuji Photo Film Company Limited in Japan and is known as "the single 8 system." Preferably both types of magazines suitable respectively for use with the two types of film cartridges just described may be quite the same as far as appearance is concerned. An example of such magazines is illustrated in FIG. 6 wherein the like reference numerals designate the components corresponding to those shown in FIG. 2. It will be readily understood that a magazine 200s such as shown in FIG. 6 is required only to include a single train of gears adapted to mesh a gear on the side of the main camera body to drive a spool shaft and a single film window such as shown by the reference characters numeral 207 in FIG. 6 (see FIG. 7 wherein the like reference numerals designate the components corresponding to those illustrated in FIG. 3) because the same is not required to be turned upside down to subject a length of single width 8 mm. cinefilm loaded therein to exposure in the opposite directions as is a magazine loaded with a length of double width 8 mm. cinefilm $F_s$.

However, as the single width type film has a different width than the double width type the width of the film passage or gate formed on the aperture assembly must be different for the two types while maintaining the position of the successive portions to be exposed of the cinefilm relative to the optical axis of the photographic objective unchanged. To this end, the magazine 200s is provided with a pair of holes 212 on the front face laterally of the film window 207 for the purpose of inserting the pair of pins 135 associated with the movable aperture member 121 into the holes 212 to render the pins ineffective. This is the difference between the magazines as illustrated in FIGS. 2 and 6 and ensures that the movable aperture member 121 is located in either of its predetermined operative positions relative to the stationary aperture member 122 to establish a passage or gate for either the single or double width types of 8 mm. cinefilm in a manner as will be subsequently described.

Figure 8:
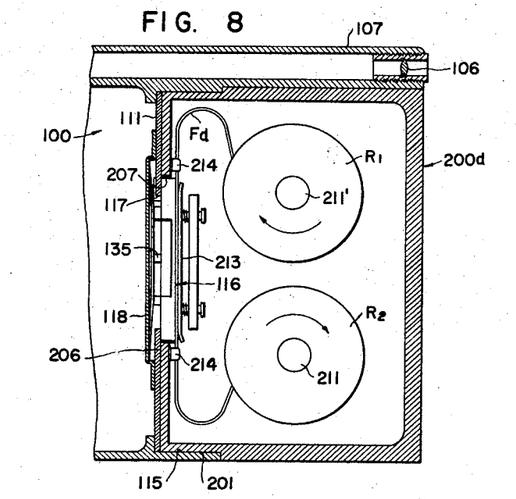
FIG. 8 is a view similar to FIG. 3 but illustrating principally an aperture assembly constructed in accordance with the teachings of the invention.
Figure 9:
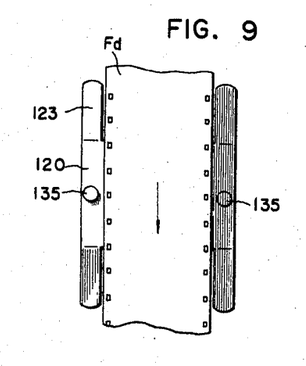
FIG. 9 is a fragmental elevational view illustrating the positional relationship between the aperture assembly and the adjacent portion of cinefilm involved as viewed from the rear side of the cinefilm with the aperture assembly in the position shown in FIG. 8.
Figure 10:
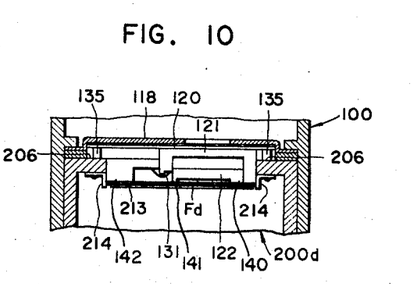
FIG. 10 is a fragmental sectional view of the aperture assembly as viewed from the top with the aperture assembly in the position shown in FIG. 8.

Referring now to FIG. 8, there is illustrated the magazine 200d suitable for exclusive use with the double width type of 8 mm. cinefilm and operatively connected to the main camera body 100. It is assumed that the magazine 200d illustrated includes a pressure plate device 213 therein. As clearly shown in FIG. 8, the stationary aperture member 122 is positioned within the opening 207 formed in the front face 206 of the magazine while the movable aperture member 121 is slightly spaced away from the stationary member 122 by having the pair of pressing pins 135 on the H-shaped leaf spring 120 depressed through their engagement with the front face 206 until the ridge 126 on the movable member is flush with the ridges 140, 141 and 142 on the stationary member as shown in FIG. 10. That is, the movable aperture member 121 is in its second operative position. Thus the wider cinefilm $Fd$ is permitted to slide between a plane formed of the end surfaces of the ridges 126, 140, 141 and 142 and the pressure plate device 213. It is to be noted that the springs 131 are in their position separated from the cinefilm $Fd$ and therefore do not interfere with this sliding movement of the cinefilm. From FIG. 9 it will be seen that the travelling cinefilm $Fd$ extends throughout the width of the aperture assembly. FIG. 10 also shows a pair of guide members 214 secured to the inner surface of the front wall of the magazine to guide both edges of the cinefilm $Fd$.

Figure 11:
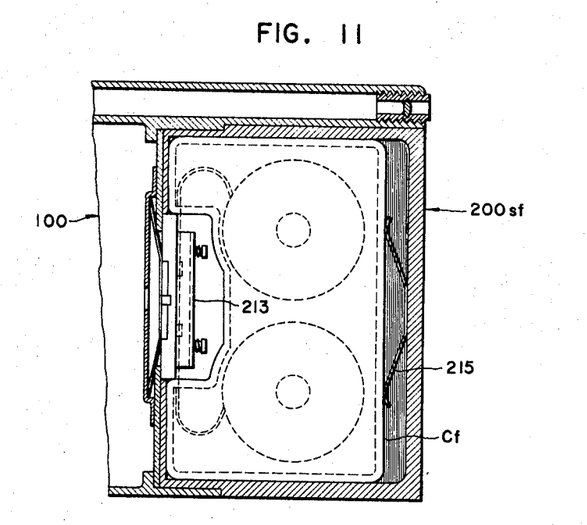
FIG. 11 is a fragmental vertical sectional view of the main camera body having a magazine having accommodated therein a cartridge including no pressure plate and for use with a length of single width 8 mm. cinefilm for the purpose of illustrating the aperture assembly.

FIG. 11 shows a magazine suitable for exclusive use with the other type of single width 8 mm. cinefilm as previously described and adapted to accommodate a film cartridge $C_f$ including no pressure plate means. Therefore, the magazine 200sf is provided with a pressure plate device 213 therein. In order to urge the cartridge $C_f$ toward the film window a leaf spring 215 is secured on the inside of the rear wall.

Figure 12:
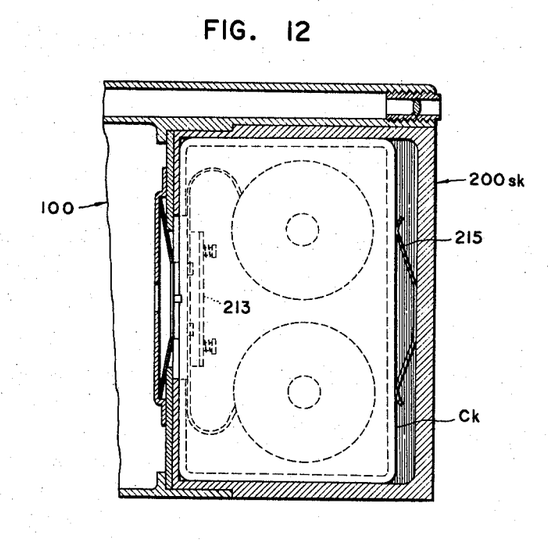
FIG. 12 is a view similar to FIG. 11 but illustrating a magazine having accommodated therein a cartridge including a pressure plate and for use with a length of single width 8 mm. cinefilm.

FIG. 12 shows a magazine suitable for exclusive use with the one type of single width 8 mm. cinefilm as previously described and adapted to accommodate a cartridge $C_k$ including a pressure plate device designated by the reference numeral 213. Therefore the magazine 200sk includes no pressure plate device but includes a leaf spring 215 for the same purpose as in FIG. 11.

Figure 13:
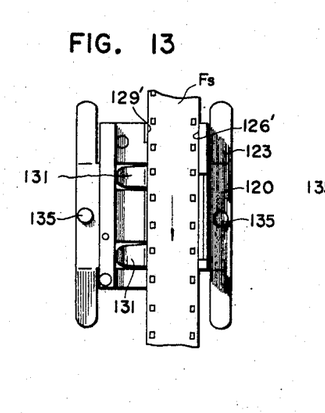
FIG. 13 is a fragmental elevational view illustrating the positional relationship between the aperture assembly and the adjacent portion of a cinefilm involved as viewed from the rear side of the cinefilm with the aperture assembly in the position shown in FIG. 11 or 12.
Figure 14:
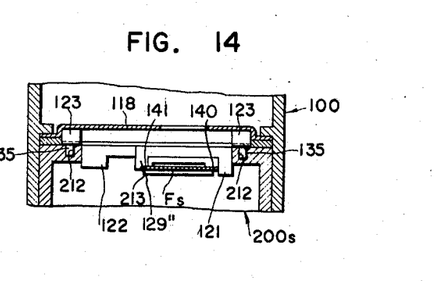
FIG. 14 is a fragmental sectional view of the aperture assembly as viewed from the top with the aperture assembly in the position shown in FIG. 11 or 12.

It is recalled that the magazine for exclusive use with the single width type has a pair of holes 212 formed on the front face as shown in FIG. 6. This is true in the case of the magazines 200sf and 200sk shown in FIGS. 11 and 12 respectively. With either of the magazines 200sf or 200sk operatively connected to the main camera body 100, the pair of pins 135 on the leaf spring 120 connected to the movable aperture member 121 is entirely received in the pair of holes 212 in the connected magazine. This maintains the movable aperture member 121 at its normal or first operative position until the film guiding surface 129″ is flush with the ridges 140 and 141 on the stationary member 122 as shown in FIG. 14. Thus a cinefilm $F_s$ is allowed to slide between a plane formed of the guiding surface 129″ and the ridges 140 and 141 and the pressure plate 213 while being sandwiched between the guide surfaces 129′ and 126′ on the movable member 121 as shown in FIG. 13. The leaf springs 131 serve to hold the cinefilm $F_s$ in contact with the guide surface 126′.

From the foregoing it will be appreciated that the invention has provided a system for interchanging a film gate in a small-sized cinematographic camera device by which connection of the particular magazine to the main camera body results in automatic setting of the width of the film gate to a magnitude suitable for a length of cinefilm loaded in the magazine. Therefore, any desired type of 8 mm. cinefilm can be instantaneously interchanged for the previously used type of cinefilm through a single manual operation of connecting the particular magazine having loaded therein the desired type of cinefilm to the main camera body in place of the previously used magazine, and without the necessity of performing any other manual operation. If a traveller makes a tour over several areas where the same type of cinefilm is difficult to obtain he has been heretofore required to carry with him either several types of cinematographic cameras or the necessary amount of a predetermined type of cinefilm. The selective use of the several types of cameras is too expensive and transportation of a large amount of cinefilm requires labor. This invention completely eliminates such disadvantages because the traveller is required only to carry with him a single main camera body which is the most expensive portion of the cinematographic camera and also two or three different types of magazines as previously described.

It is also known that the aperture assembly is extremely small-sized and includes many portions required to be machined with a high degree of accuracy. The use of at least three adjusting screws according to the teachings of the invention permits the operating surfaces of the aperture assembly to be finely adjusted resulting in simplification or substantial elimination of finish machining of those portions of the movable and stationary aperture members pressing in contact relationship against each other and also in facilitation of adjustment during the assembling operation. This leads to an inexpensive aperture assembly in spite of the two part unit.

While the invention has been shown and described in conjunction with certain preferred embodiments thereof it is to be understood that the invention is not restricted thereto or thereby and that various changes can be made in the details of construction and the arrangement of and combination of parts without departing from the spirit and scope of the invention.

What we claim is:

1. In a small-sized cinematographic camera including a main body and two magazines adapted to be detachably connected to the main body one at a time, the magazines each having loaded therein a length of cinefilm having a different width from the film in the other magazine, the main body having a coupling surface to which the magazines are to be coupled, an aperture plate assembly including:

(a) a stationary aperture plate having an aperture on the optical axis of the camera and positioned on the coupling surface of the main camera body, the stationary aperture plate having three ridges disposed in spaced parallel relationship and extending in the direction of travel of the cinefilm, the two outside ridges defining a surface on which the wider cinefilm travels, while the intermediate ridge and one of the outside ridges defines a surface on which the narrower cinefilm travels, and the stationary aperture plate having guides extending parallel to the optical axis and abutting means;

(b) a movable aperture plate movable in said guides between an operative and an inoperative position along the optical axis of the camera and having an aperture on the optical axis of the camera and coinciding with the aperture in said stationary aperture plate, the movable aperture plate including means for guiding at least one lateral edge of one of the cinefilms in cooperation with at least one ridge on said stationary aperture plate, the guiding means being movable with the movable aperture plate from a position where it projects through a plane defined by the surfaces of the three parallel ridges on the stationary aperture plate in the operative position of the movable aperture plate to a position below said plane in the inoperative position of said movable aperture plate, the movable aperture plate being prevented from disengaging from the stationary aperture plate by abutting said abutting means on the stationary aperture plate;

(c) a resilient member engaging said movable aperture plate and tending to normally bias the movable aperture plate toward its operative position and having control means thereon engageable by regulation means disposed on that surface of a magazine which abuts the coupling surface when the magazine is operatively coupled to the main camera body;

whereby when a magazine with the wider film and having regulation means thereon is coupled to the main camera body, the movable aperture plate is moved to the inoperative position, and when a magazine with the narrower film and the regulation means is coupled to the main camera body, the movable aperture plate remains in the operative position.

2. An aperture plate assembly as claimed in claim 1 wherein in order to finely adjust the operative position of the movable aperture plate relative to the stationary aperture plate at least three adjusting screws are disposed on the stationary aperture plate to change the gap between the stationary and movable aperture plates.

References Cited

UNITED STATES PATENTS

| 1,846,049 | 2/1932 | Dina | 352—79 |
| 2,087,250 | 6/1933 | Foster | 352—80 |
| 2,186,443 | 1/1940 | Becker | 352—80 |
| 3,208,363 | 9/1965 | Easterly | 352—72 X |

FOREIGN PATENTS

| 105,812 | 11/1938 | Australia. |
| 131,708 | 2/1933 | Austria. |
| 1,037,041 | 4/1953 | France. |

NORTON ANSHER, *Primary Examiner.*

MONROE H. HAYES, *Assistant Examiner.*

U.S. Cl. X.R.

352—224